United States Patent [19]

Drygalski

[11] 4,421,326
[45] Dec. 20, 1983

[54] OIL SEALS WITH MOUNTING SURFACE VENT MECHANISMS

[76] Inventor: Gordon T. Drygalski, 5451 N. East River Rd., Chicago, Ill. 60656

[21] Appl. No.: 427,826

[22] Filed: Sep. 29, 1982

[51] Int. Cl.³ .................................................. F16C 33/78
[52] U.S. Cl. ....................................... 277/50; 277/83; 277/92; 384/143; 308/187.1
[58] Field of Search ................................ 277/50, 83, 91; 308/36.1, 36.3, 187.1, 187.2

[56] References Cited

U.S. PATENT DOCUMENTS

| | | | |
|---|---|---|---|
| 3,276,783 | 10/1966 | McKiniven | 277/50 |
| 3,432,174 | 3/1969 | Teske et al. | 277/83 |
| 3,458,207 | 7/1969 | Conti | 277/83 |
| 3,963,248 | 6/1976 | Bainard | 277/92 |
| 4,325,591 | 4/1982 | Otto | 277/50 |
| 4,327,922 | 5/1982 | Walther | 277/50 |

*Primary Examiner*—Robert I. Smith
*Attorney, Agent, or Firm*—James T. FitzGibbon

[57] ABSTRACT

The invention relates to a fluid seal unit which vents gas pressure from a sealed region. The seal includes vents extending axially along its inside or outside mounting surface diameter, preferably communicating with an annular manifold lying adjacent one face of the seal. The manifold in turn is sealed by a flexible diaphragm which provides a valve or vent control action in use. The mounting surface containing the vent may be a metal surface, forming a part of the seal casing or a rubber surface where the seal has a rubber covered mounting flange.

15 Claims, 12 Drawing Figures

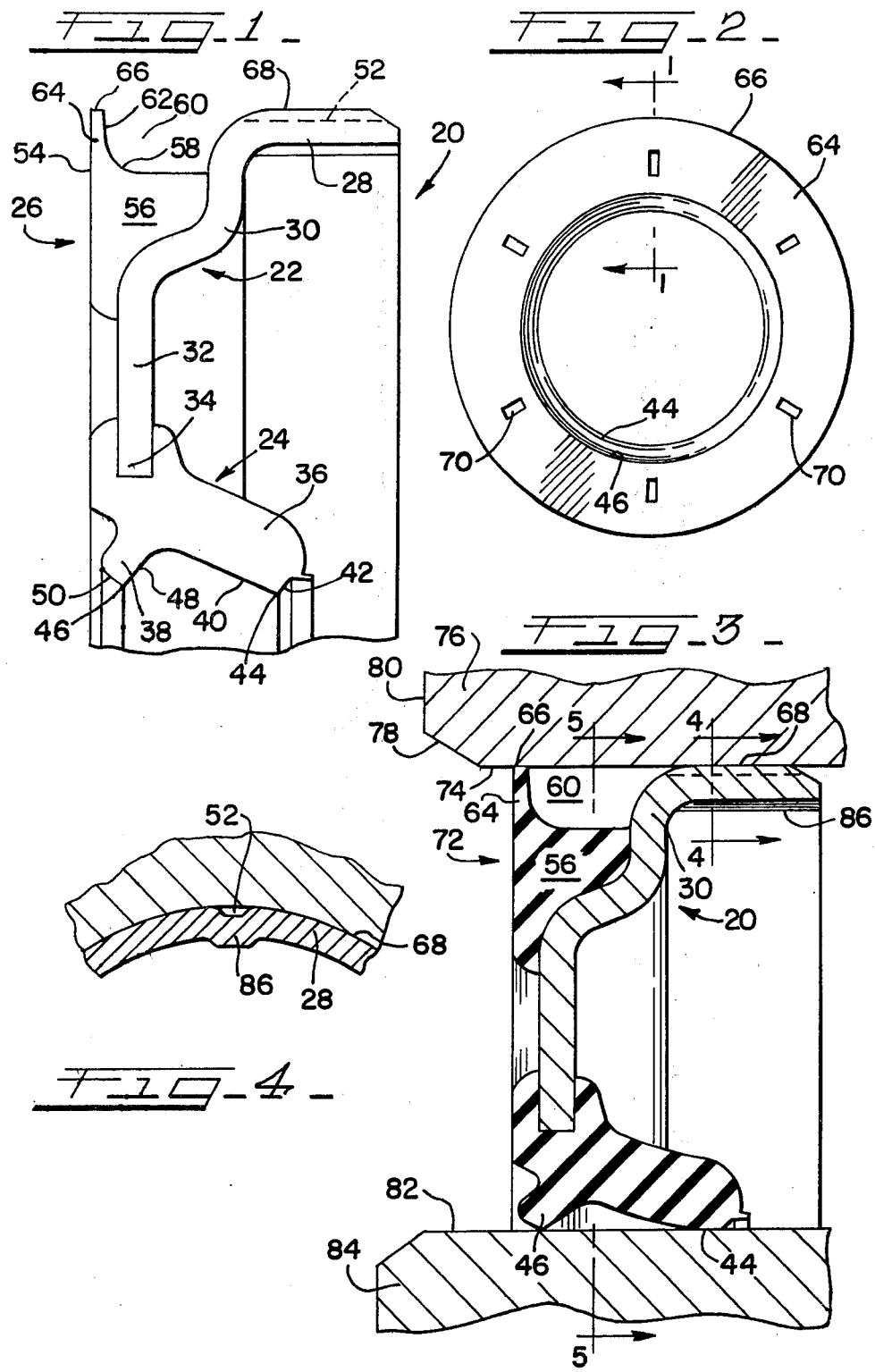

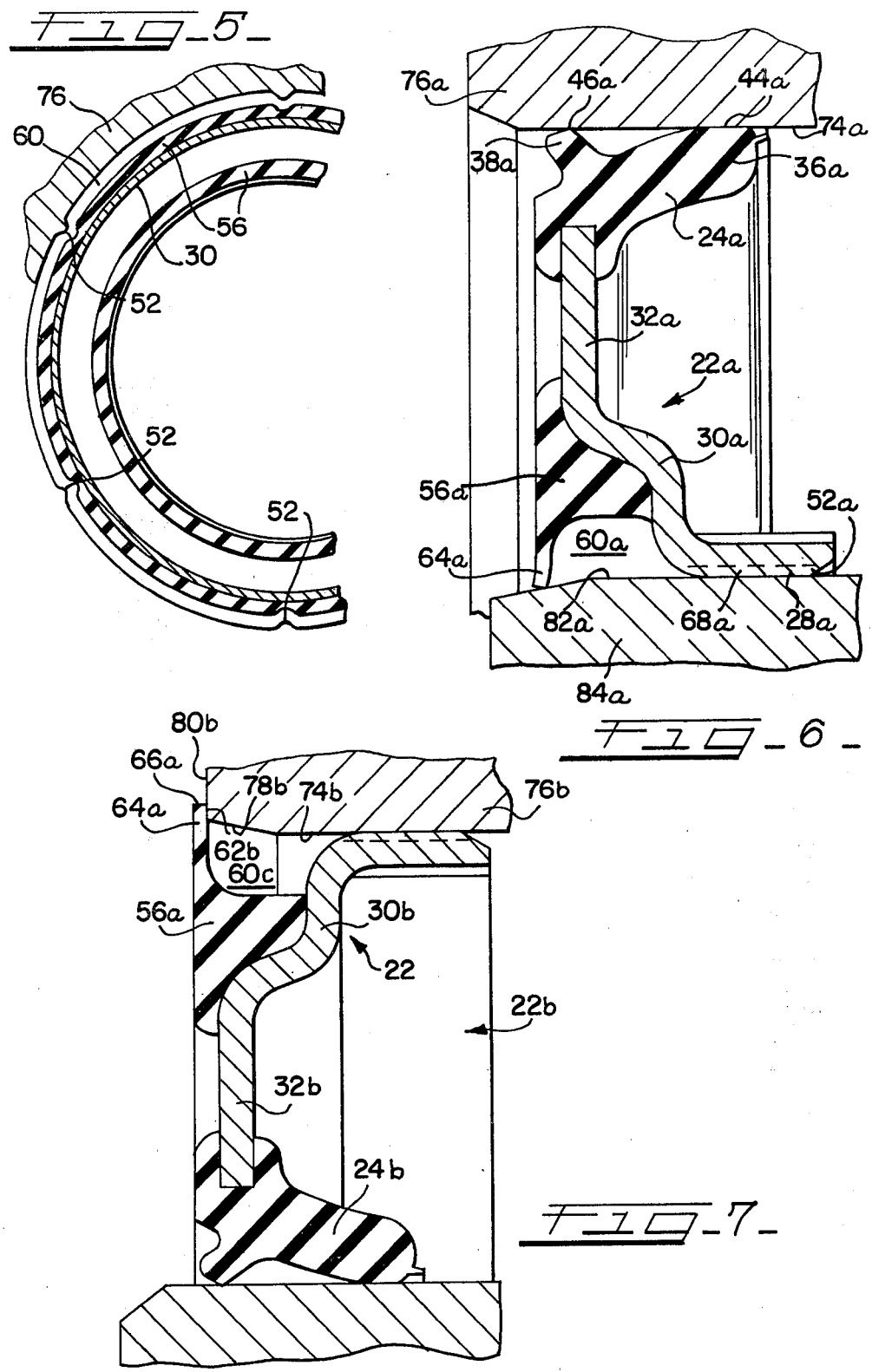

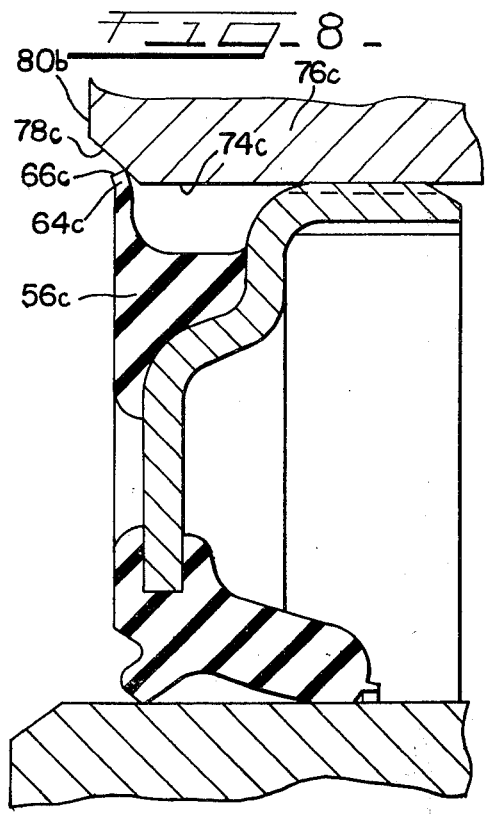
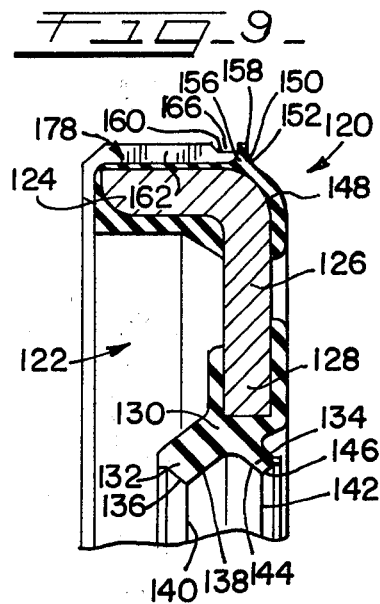
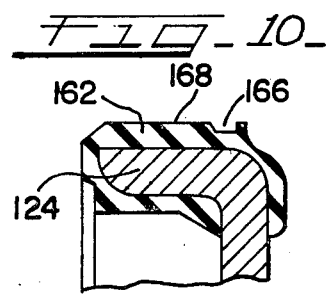
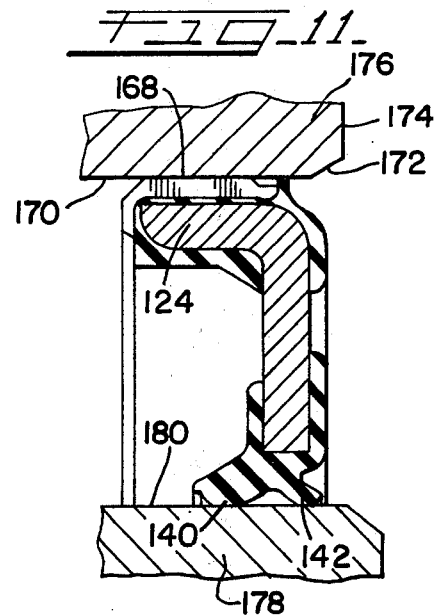
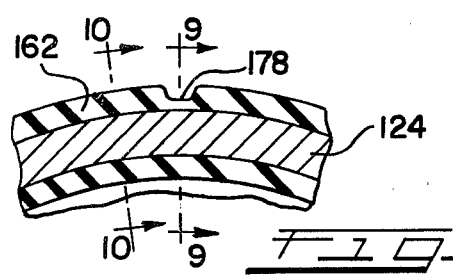

OIL SEALS WITH MOUNTING SURFACE VENT MECHANISMS

The present invention relates generally to improved oil seals, and more particularly, to oil seals adapted for use in sealing environments subject to transient pressure changes, especially rapid pressure buildup, usually caused by rapid changes of temperature, and lubricant evaporation, followed by intake of air and moisture condensation during use.

More specifically, the invention relates to lip type or radially acting shaft seals of the type customarily used with zero or very low pressure differentials across the oil and air sides of the seal, as opposed to rod wiper, power steering or other high pressure seals, but which improved seals are adapted to withstand moderate pressures such as those on the order of two to thirty pounds per square inch (psi).

As current automotive design has progressed, there has been an increased emphasis on reducing the mass and physical dimensions of component parts of all kinds. In particular, there have been extensive engineering efforts devoted to the concept of size and weight reduction in the drive components of vehicles. Thus, compact, smaller-engined, front wheel drive systems are now very commonly employed in American automobiles. In many cases, these automobiles utilize engines which are compact four cyclinder designs or V-6 design engines placed transversely in the chassis in the interest of providing increased interior room in a vehicle having limited overall length and wheelbase. In particular, great attention has been paid to providing adequate toe board room in vehicles, with the consequence that the transverse engine layout has achieved much greater popularity than that heretofore imagined for this layout. With the emphasis in saving space by such engine disposition, particularly in conjunction with the use of front wheel drive for space saving reasons, it has also become increasingly important to minimize the overall dimensions of drive line components, including transmissions, transfer cases, and final drive elements, including half shafts, wheel hubs and the like.

A further consideration is present in the case of front wheel drive cars, most or all of which require a universal joint and bearing package carried in or near the front wheel hubs. Packages such as this, in order to provide satisfactory overall performance, are desirably compact so that they will fit within the confines of wheel hubs which are being made in even smaller sizes, and lighter for reduction of unsprung weight which is a necessity to maintain satisfactory riding qualities and to decrease wear on expensive suspension components. Compact, lightweight assemblies also reduce unsprung mass, and thus decrease the work which is required to be done by suspension components; this, in turn, lengthens the life of such components and/or lowers their cost. Consequently, suspension componet designers have developed compact unitized bearing assemblies having one or more pairs of tapered roller bearings adapted to locate the ends of final drive half shafts or the like within a wheel hub to permit power transmission and accurate location of these components. Because of the severe service to which these units are subjected, oil sealing has become a critical problem.

Specifically, if the units are loosely sealed, they undergo periodic ingestion and expulsion of moisture caused by the presence of minute amounts of moisture within the sealed region and movement through a wide range of temperature variations. These seals thus tend to be exposed to interior pressure of five, ten, or up to twenty to fifty psi, which, in the case of a conventional oil seal, would either be retained in the sealed region or would be vented from the sealed cavity through the seal-shaft interface. When the sealed mechanism cooled, vacuum on the interior would cause another pressure differential across the seal, resulting in the possible ingestion of water or grit from the immediate exterior of the sealed region. Continual cycling of the seal through pressure differentials of this kind has proven to shorten the seal life significantly. This, in turn, is considered a serious drawback, not so much because of the cost of the seal, which is moderate, but from the high cost of labor associated with removing and replacing the seal. Consequently, in view of increased demand for mechanisms of the type described, there has been a demand for an oil seal which would permit a certain amount of venting which could be carried out other than at the interface between the sealed parts, such as a rotary shaft, and a portion of the seal, namely, the primary seal lip.

According to the present invention, provision is made for a seal which can be vented on its mounting diameter with the provision of a properly placed diaphragm in conjunction with axially extending passages located on the mounting diameter of the seal unit.

In view of the failure of the prior art to provide a seal having satisfactory venting for internal pressure other than through the sealing lip itself, there has been a need for a so-called OD (outside diameter) venting seal, and for a counterpart seal which will vent at its inner diameter (ID) if the seal is mounted on its ID instead of its OD. It is therefore an object of the invention to provide an improved OD or equivalent venting seal for use in sealed mechanisms.

Another object of the invention is to provide an OD venting seal concept which is applicable with both so-called rubber OD and metal OD seals.

A further object of the invention is to provide a seal which is adapted to vent gaseous material such as water vapor or the like, but which will not permit the escape of measurable grease or oil from the sealed region.

A still further object is to provide an OD venting seal which can be manufactured by the use of existing technology.

Yet another object is to provide an exterior or outside diameter venting seal which includes axially directed ports on its exterior, used in connection with a diaphragm connected to form an initially gas tight but readily vented seal in cooperation with other parts of the sealed mechanism.

A further object of the invention is to provide an OD venting seal which includes a conventional primary sealing lip having air and oil side surfaces, with or without an auxiliary, secondary, or so-called dirt lip and which uses conventional components or portions in this area so as to avoid the need for redesign and re-evaluation when submitted for approval in existing applications.

Another object of the invention is to provide an OD venting seal which readily permits the escape of vapor from the sealed region, but which restricts the escape of grease or oil therefrom.

A further object is to provide a venting seal having a radially extending diaphragm portion made from an elastomer and extending substantially coplanar with one end face of the seal casing, and which also includes an outside diameter portion having grooves extending axially of the secondary sealing surface and communicating with an annular gas passage manifold lying between such axial passages and the diaphragm.

A still further object is to provide a one piece seal unit having a rubber exterior or secondary seal with axially extending grooves, vents or passages therein which communicate with an annular passage or manifold, which in turn is defined in part by part of the seal casing and in part by a flexible, radially extending diaphragm unit of thin cross-section.

Yet another object is to provide a seal adapted to vent a sealed region but adapted to have a vent and diaphragm system on its inner diameter, which, in turn, is spaced apart from a portion of the seal casing to which the primary sealing lip is bonded.

The foregoing and other objects and advantages of the invention are achieved in practice by providing an oil seal unit having a casing portion which includes axial and radial flanges, joined by a transition portion, and an elastomeric seal body and a vent system which includes axial passages in or along an axial casing flange, an annular manifold communicating with the passages, and a radially extending diaphragm of thin cross-section having at least one marginal surface adapted for cooperative engagement with a portion of the sealed mechanism to permit venting of vapor material from the sealed region by deflection of said diaphragm under load.

The exact manner in which the invention achieves the foregoing and other of its inherent objects and advantages will become more apparent when reference is made to the following detailed description of the preferred embodiments of the invention set forth by way of example, and to the accompanying drawings, wherein like reference numbers indicate corresponding parts throughout the several figures.

BRIEF DESCRIPTION OF THE DRAWINGS

FIG. 1 is a vertical sectional view, on an enlarged scale, and with portions broken away, showing the principal components of one form of novel shaft seal of the invention;

FIG. 2 is an outside end elevational view of the seal of FIG. 1, shown on a reduced scale;

FIG. 3 is a vertical sectional view, similar to that of FIG. 1 but showing the seal installed within a machine opening and with the sealing lips engaged with an associated rotatable shaft;

FIG. 4 is a fragmentary vertical sectional view, taken on lines 4—4 of FIG. 3;

FIG. 5 is a fragmentary vertical sectional view of the seal of FIG. 3, taken along lines 5—5 thereof;

FIG. 6 is a fragmentary sectional view of a modified form of seal made according to the invention;

FIG. 7 is a vertical sectional view of a further modified seal incorporating the principles of the invention;

FIG. 8 is a vertical sectional view of a seal similar to that of FIG. 7, but shown positioned in a slightly different installation;

FIG. 9 is a vertical sectional view of another form of seal made according to the invention;

FIG. 10 is a fragmentary vertical sectional view of the seal of FIG. 9, taken along lines 10—10 of FIG. 12;

FIG. 11 is a fragmentary vertical sectional view of the seal of FIGS. 9-10, showing the same in an installed position of use; and FIG. 12 is a fragmentary end sectional view similar to that of FIG. 4, but showing the form of seal shown in FIGS. 9-12.

DESCRIPTION OF THE PREFERRED EMBODIMENTS OF THE INVENTION

Before referring to the preferred embodiments of the invention in detail, it will be understood that although seals of the invention customarily include a secondary sealing diameter which is the outer diameter of the seal, and a dynamic or primary seal diameter which is an inner diameter, these portions may be reversed in use so that the dynamic or primary seal is on the outside diameter of the seal assembly and the secondary or static seal is on the inner diameter. Because such seals, in by far the great majority of cases, embody the outer diameter as the static seal, detailed reference to the seals herein is made with the understanding that this is conventional but not necessary; the claims make reference to the seals in terms of the static or secondary sealing diameter as the mounting surface diameter and the other diameter as the primary or dynamic sealing diameter.

Referring now to the drawings in greater detail, FIGS. 1-3 show a so-called metal outer diameter (OD) venting seal 20 embodying the principles of the invention and shown to include as principal elements thereof, a metal or like stamped seal casing 22, a primary or dynamic elastomeric seal body 24, and a secondary or static seal body generally designated 26. The stamping, stiffener, or casing portion 22 preferably includes a metal outside diameter axially extending flange 28, a contoured transition surface 30 and a radially inwardly extending flange 32. The innermost portion 34 of the flange 32 has bonded thereto the elastomeric primary or dynamic seal body 24 which is in turn subdivided into a primary seal body 36 and a secondary or so-called "dirt" or "excluder" lip body 38. The primary sealing lip body 36 is shown to include on its inner surfaces an air side generally frusto-conical surface 40 and a so-called oil side frusto-conical surface 42, with these surfaces meeting along a line to form a primary seal band 44, that is, the area of intended cooperative sealing engagement within an associated shaft. The auxiliary or dirt lip 38 includes a seal band 46 which is defined by the meeting of axially inner and outer frusto-conical air side surfaces 48, 50. The primary and secondary seal bands are shown as being circular, but it is understood that they may also be sinuous, as shown in U.S. Pat. No. 3,927,600; the air side surface may also include hydrodynamic formations of any known kind, including those shown in U.S. Pat. Nos. 3,640,542 and 3,790,180, for example.

In addition to the foregoing elements, most or all of which are known per se in the oil seal industry, the seal of the invention also includes a plurality of axially extending vent passages 52, seen as grooves in the outer diameter of the axial flange 28, and a certain configuration of the static seal body 26, namely, an axially outer end face surface 54, an inner body portion 56, a contoured surface 58 serving, in combination with a portion of the contour transition surface 30 of the stamping 22 to define an at least partially annular circumferentially extending groove 60 which may, as will appear, be thought of as a manifold. A radially outermost portion of the static seal body end surface 54 cooperates with an axially inner radial surface 62 to define a thin, flexible venting diaphragm 64. The radially outermost, axially extending surface 66 of this diaphragm 64 is shown as being about the same as, or just slightly larger than, the outermost diameter of the axial stamping flange 28.

The seal 20 may also include chaplets or indentations 70 in the face 54 of the static seal body for known purposes, namely, to aid in positioning the stamping during manufacture.

FIG. 2 also shows that, when viewed from the axially outer end, or looking inwardly toward the sealed region, the outermost surface 66 of the diaphragm 64 obscures a view of the outside diameter 68 of the stamping flange 28.

FIG. 2 shows that the radially inner portions of the seal 20 include both the seal band 46 of the dirt lip 38 and the seal band 44 of the primary lip, which bands are of slightly different diameters in the free condition of the seal.

Referring now to FIG. 3, the seal of FIG. 1 is shown disposed within an opening generally designated 72 and defined in part by a counterbore section 74 in a machine element 76. A chamfer 78 is provided where the axially outer end of the counterbore surface 78 meets the flush surface 80 of the machine member 76. The outside diameter surface 68 of the seal 20 is shown to be a press-fit or interference fit in the counterbore 74, having been installed therein in a manner known to those skilled in the art. This outside surface 68 is referred to as a metal OD surface, which is customary, but it is understood that this surface may also include a coating of a plastic or rubbery material to aid in installation if desired.

FIG. 3 also shows that the seal band portions 44, 46 of the respective primary and secondary dynamic lips rest on the outer diameter surface 82 of a shaft 84 which is journaled for rotation within the housing or machine member 76. As shown, the sealed region containing the grease or other lubricant would lie to the right as shown in FIG. 3, which also shows that a circumferentially extending passage 60 is provided between the shoulder 30 of the stamping and the remaining parts of the elastomeric static seal body 56.

The outermost diameter surface 66 of the diaphragm 64 is also shown to be seated in an interference fit in the counterbore 74; as will appear, this diaphragm is flexible enough to be unseated by the application of pressures acting either inwardly or outwardly with respect to the seal and the sealed region.

FIG. 4 is a fragmentary end view showing that the axial flange 28 of the stamping 22 includes a series of spaced apart axial grooves 52 formed therein by inwardly extending channels 86 formed at spaced apart portions of the outer diameter of the axial flange 28. The axial vents or passages 52 may be formed in the outer diameter surface 68 of the flange 28 as by grinding, cutting or the like, by coining, as a part of the stamping operation, or otherwise.

As shown in FIG. 5, a number of such channels 86 are provided, preferably six or eight channels, spaced equally apart about the outside diameter of the flange 28.

Referring now to the operation of the seal in use, when installed in a conventional manner, a tight mechanical seal is created between the inner surface of the counterbore 74 and the outside metal diameter surface 68. This mechanically locates, centers and aligns the seal in the conventional manner. The surface 66 of the diaphragm 64 likewise engages the counterbore, creating a low-pressure air and fluid tight seal. Assuming that the installation is otherwise complete and that the bearings and other sealed parts are greased, further assuming that the "head space" thereover is quite small, with the cavity being filled to 50% to 80% of its volume by contents including moisture-containing grease, when the mechanism is operated under highly stressed conditions, rapid temperature rise takes place, heating the seal to some 350° to 400° F. This causes outgassing in the grease, pressure buildup in the air, and significant pressure buildup caused by vaporization of the water or water vapor in the sealed cavity. This pressure, however, is able to be vented through the axial grooves 52 in the flange 28, one or more of which will be exposed to grease, and others of which will probably not be so exposed. Thereupon, hot air, water vapor, and in some cases, lubricant, is vented from this area into the seal body collector groove or manifold 60 whence it is bled to the air by deflection of the diaphragm body. Thus, when the pressure differential across the diaphragm body 64 exceeds a few psi, the diaphragm will instanteously open to relieve the pressure, at any one or more points about the outside diameter of the seal. This occurs periodically as temperature builds up, with the result that the actual pressure buildup is moderate at most. Under these conditions, damaging and dangerous cavity pressure does not build up.

One feature of a preferred form of seal made according to the invention is the manifold 60 which is provided by spacing the diaphragm axially apart from adjacent portions of the seal body such as the casing. The manifold provides a certain volume for accommodating gas, vapor or grease and also permits equalizing pressure among the various vents which are spaced apart about the periphery of the seal. Thus, in some cases, even if small amounts of grease are discharged into the groove, they tend to remain there, and to become evenly distributed about in the groove before leaking to the outside. Pressure may be relieved by circumferential movement of the lubricant as well as axial movement thereof.

When the sealed assembly cools, which is normally a much more gradual temperature change than that encountered during temperature rise, the diaphragm is able to deflect axially inwardly, permitting pressure within the sealed cavity to be re-equalized. While the re-entry of some air having liquid water or water vapor therein may occur, this is not harmful because upon re-heating, the seal again vents in the same manner as just described. Seals embodying the principles of the invention have performed satisfactorily through many hundreds or thousands of heat buildup cycles without adverse effects.

As will now appear, the principles of the seal just described may be embodied in other configurations utilizing the principals of the invention.

Referring now to FIG. 6, a seal unit 20a is shown which has the same essential components as those described, namely, an annular secondary sealing diameter flange 28a, which in this instance, lies on the inner diameter of the seal and is shown to include a surface 68a lying in press fit engagement with the outer diameter surface 82a of an associated shaft 84a. It will be understood that while the shaft 84a rotates relative to the associated machine element or housing 76a, that there is no relative motion between the flange 28a and the member 84a. Consequently this is a so-called secondary static seal.

The axially extending vent grooves 52a are also provided as is the manifold 60a defined by the elastomeric static seal body 56a having the diaphragm 64a, and other parts such as those of its counterpart in the seal of FIGS. 1–5. This unit shown in FIG. 6 also includes the stamping transistion or shoulder surface 30 of the stamping 22 and the radial flange 32a. The elastomeric lip unit 24a is subdivided into primary and auxiliary lip bodies 36a, 38a. In this instance, there is relative motion between the seal bands 44a, 46a and the counterbore surface 74a of the member 76a. Consequently, the seal just described has its components reversed in relation to their counterparts in the earlier figures, but functions in the same way.

Referring now to FIG. 7, a seal assembly 20b similar to its counterpart in FIGS. 1–5 is shown as having counterpart portions including an elastomeric seal body 24b, a stamping 22b having the various flanges 30b, 32b, etc. An elastomeric static seal body 56b is also provided which includes elements forming the diaphragm 64b. In this instance, the diaphragm is constructed and arranged so that its outermost diameter axial surface 66b is larger than that of both the bore portion 74b and chamfer portion 78b. As a result, a seal is formed between the innermost face 62b of the diaphragm 64b and the outer end face 80b of the machine member 76b.

In other respects, including functionality, the seal of FIG. 7 is the same as its counterparts. In operation, the venting is the same, except that the diaphragm moves outwardly away from the end face surface 80b to allow venting; on cooling the diaphragm may deflect inwardly sufficient to relieve the pressure (or vacuum). In normal expanding or internal pressure release mode, the action, however, is that just described.

FIG. 8 shows a further modified form of seal 20c having all the elements just described, except that the outermost surface 66c engages the chamfer or bevel portion 78c of the counterbore 74c on the machine member 76c. Thus, the outermost diameter axial surface 66c of the body 64c of the diaphragm is larger than that of the C-bore 74c, but not as large as the inner diameter of the axial end face 80b of the opening receiving the seal, shaft, and associated parts. In other aspects, including operation, the seal is the same as that of its other counterparts.

Referring now to FIGS. 9–12, a seal is shown which is similar to those earlier described, except that it is a so-called rubber OD type seal, that is, it has rubber on its mounting surface.

FIGS. 9–12 illustrates a seal generally designated 120 and shown to have a rigid casing portion 122, with an axial flange 124 and a radial flange 126, having the radially innermost portion 128 thereof bonded to an elastomeric dynamic seal body 130. The seal body includes a primary seal lip forming portion 132, and an auxiliary or excluder lip forming portion 134. The primary lip 132 includes oil and air side surfaces 136, 138, meeting along a line 140 to form a seal band, while the seal band 142 of the secondary lip 134 is formed by the convergence of seal frusto-conical surfaces 144, 146. These surfaces function as their counterparts in the earlier described embodiments. In the seal of FIGS. 9–12, an elastomeric static seal body 148 is provided, and the upper portion thereof comprises a diaphragm-forming body 150 which includes axially outer and inner surfaces 152, 156 joined at their outermost edges by a generally axially extending end or OD surface 158. An axially extending annular surface 160, located axially inwardly of the surface 156, cooperates with the surface 156 and with other portions of the axially extending elastomeric outer seal locating body 162 to form a circumferential manifold or groove 166, which functions as does its counterpart 60 in the above described embodiments.

The principal differences between the seal just described and its earlier described counterparts are that the body 162 causes the seal to be known as a so-called rubber OD seal, more properly, a seal having a rubber secondary or mounting surface seal forming body. As shown, the outermost surface 168 of the body 162 is sized so as to be press fit into a counterbore 170 located inwardly of a chamfer 172 in an end face 174 of a machine part or housing 176, which in turn accommodates a shaft 178. As shown, the outer diameter surface 180 of the rotary shaft 178 is sized so as to engage the seal band forming portions 140, 142 of the dynamic seal primary and secondary lips.

In the seal of FIGS. 9–12, a plurality of axially extending grooves 178 are formed by molding in the outside diameter of the seal. FIG. 12 shows that the axial flange 124 of the stamping is of a constant diameter and of conventional construction and that the spaced apart vent grooves 178 are merely formed by molding as areas of reduced diameter. This is accomplished in a known manner.

Accordingly, in use, the seal of FIGS. 9–12 functions in the same manner as it counterpart and differs therefrom only in that the static or secondary seal is achieved by contact between a rubber body and a metal body. The provision of the circumferential collector groove or manifold, the flexible diaphragm and its interfit with the associated seal receiving counterbore, and the provision of a plurality of circumferentially spaced apart, axially extending vent grooves are also present in this seal.

While not illustrated, it is understood that the seal of FIGS. 9–12 might also be constructed in an inverted relation corresponding to the seals shown in FIG. 6.

Seals made according to the present invention in both the rubber and metal outside diameter portion can be installed readily using known equipment, and do not require substantial added manufacturing costs, but provide the advantages of pressure venting and balancing referred to above.

It will thus be seen that the present invention provides a novel oil seal having a number of advantages and characteristics, including those pointed out above, and others which are inherent in the invention. A preferred embodiment of the invention having been described by way of illustration, it is anticipated that changes and modifications of the oil seal described above will occur to those skilled in the art, and that such changes and modifications may be made without departing from the spirit of the invention or the scope of the appended claims.

I claim:

1. A fluid seal unit comprising, in combination, an annular casing portion and a first annular elastomeric seal body portion, said casing being made at least in part from a relatively rigid material, and having axially and radially extending flanges, with at least a portion of said axial flange being adapted for snug, fluid-tight engagement with an associated portion of a sealed mechanism, and with a portion of said radial flange being a bonding portion to which said first elastomeric seal body is secured, said first seal body including generally frustoconical air and oil side surfaces meeting each other along a generally circular locus to define a primary seal band adapted to engage a portion of the sealed mechanism with which the seal is associated in use, a second elastomeric seal body attached to at least one of said axial and radial flanges and adapted to form, in combination therewith, and at least partially circumferentially extending manifold groove, a portion of said second body further defining a resilient diaphragm portion of thin cross section which is adapted to be displaced under fluid pressure to move between sealed and opened positions and having a portion adapted to lie in a normally closed position in contact with a portion of said associated sealed mechanism in fluid sealing engagement therewith, and at least one axially extending vent passage formed in an axially extending flange portion of said seal unit and adapted to provide a path of fluid communication between the interior of said sealed region and said manifold groove, whereby fluid pressure in excess of a predetermined level may be released by passage of said fluid through said axial vent, into said manifold, and outwardly therefrom by displacement of said diaphragm portion.

2. A fluid seal unit as defined in claim 1 wherein said at least one axially extending vent passages comprises a plurality of spaced apart vent passages.

3. A fluid seal unit as defined in claim 1 wherein said axially extending flange includes an elastomer-covered surface adapted to form said seal with said associated portion of said sealed mechanism, and wherein said at least one vent passage is formed exclusively in said elastomer.

4. A fluid seal unit as defined in claim 3 wherein said at least one axially extending vent passages comprises a plurality of spaced apart vent passages.

5. A fluid seal unit as defined in claim 1 wherein said portion of said axial flange which is adapted for said snug, fluid-tight engagement with said associated portion of said sealed mechanism lies on an outer diameter surface of said seal.

6. A fluid seal unit as defined in claim 1 wherein said portion of said axial flange which is adapted for said snug, fluid-tight engagement with said associated portion of said sealed mechanism lies on an inside diameter surface of said seal.

7. A fluid seal unit as defined in claim 1 wherein said axial flange of said casing is made substantially entirely from a relatively rigid material, and wherein said stamping has a contoured transition portion joining said axially and radially extending flanges to each other, with said transition portion cooperating with said second elastomeric seal body to define said manifold groove.

8. A fluid seal unit as defined in claim 1 wherein said axial flange includes an elastomer-covered outer diameter surface and said vent passage are both formed exclusively in said elastomer covering.

9. A fluid seal unit as defined in claim 1 wherein said diaphragm has its outer diameter sized substantially the same as the outside diameter of the outermost portion of said axial flange, whereby engagement between said resilient diaphragm portion and said portion of said sealed mchanism is provided by a slight interference fit with respect to said section of said sealed mechanism and said outer portion of said resilient diaphragm.

10. A fluid seal unit as defined in claim 1 wherein said diaphragm portion of said second elastomeric seal body has an enlarged diameter with respect to the outermost diameter of said seal flange portion of said seal, said diaphragm having a portion adapted to engage a radially extending portion of said sealed mechanism in end face sealing engagement.

11. A fluid seal unit as defined in claim 1 wherein said at least one axially extending vent passages comprises at least four vent passages substantially equally spaced apart and wherein said manifold groove extends about the entire circumference of said seal unit.

12. A fluid seal unit as defined in claim 1 wherein said first elastomeric seal body includes an auxiliary lip adapted to exclude contaminants from said sealed region.

13. A fluid seal unit comprising, in combination, an annular elastomeric seal body and an annular casing element, said seal body having a portion thereof bonded to a portion of said casing, said casing including an annular portion having radial and axial flanges, with a portion of said axial flange acting as a mounting surface and having a surface thereof adapted to engage the surface of an associated machine member in a mechanically snug and fluid tight, sealed relation, said seal body including a first and second frustoconical surfaces meeting each other along a generally circular locus which, in combination with a relatively movable part of a sealed mechanism, is adapted to form a primary seal band, one of said frustoconical surfaces being directed toward the interior of a sealed region defined in part by said seal and in part by portions of said sealed mechanism, and the other of said frustoconical surfaces being directed at least partially away from said sealed region, said seal unit further including at least one axially extending vent passage formed in said seal casing and having one end thereof communicating with the interior of said sealed region, means defining an at least partly circumferentially extending region for collecting fluid passing through said axial vent passage with said collecting region communicating with the other end of said vent passage, said means further defining an elastomeric diaphragm adapted to move between open and closed positions and having an annular surface adapted to engage a portion of said sealed mechanism in snug sealing engagement in the closed position thereof, and being adapted, when open, to permit discharge of fluid from said sealed region when pressure therein exceeds a predetermined level, said seal assembly, in use, being thereby adapted to vent fluid, including vapor, from said sealed region to the atmosphere to avoid excessive pressure buildup within said sealed region.

14. A fluid seal unit as defined in claim 4 wherein said collecting means and said axially extending vent passage are formed entirely within an elastomeric body covering the axial flange of said casing unit.

15. A fluid seal unit as defined in claim 4 wherein said casing is made from metal and said axially extending vent passage is formed in a metal exterior extension surface of said casing, and wherein said collection region has its contour defined at least in part by an annular contoured portion of said casing which extends between and joins said radial and axial flanges thereof.

* * * * *